United States Patent Office 3,312,756
Patented Apr. 4, 1967

3,312,756
BLENDS OF VINYL CHLORIDE POLYMER AND HYDROCARBON ELASTOMER CONTAINING GRAFT COPOLYMER AS COMPATIBILIZER
Massimo Baer, Longmeadow, and Ernest H. Hankey, Springfield, Mass., assignors to Monsanto Company, St. Louis, Mo., a corporation of Delaware
No Drawing. Filed June 6, 1966, Ser. No. 555,271
9 Claims. (Cl. 260—876)

The present invention relates to blends of thermoplastic polymers and more particularly to blends of a rigid vinyl chloride polymer and a hydrocarbon elastomer. This application is a continuation-in-part of the copending application Ser. No. 256,272, filed Feb. 5, 1963, allowed on May 6, 1966, and now abandoned, which in turn is a division of application Ser. No. 800,911, filed Mar. 23, 1959, now U.S. Patent 3,085,082.

It is known that blends of rigid vinyl chloride polymers and certain diene elastomers which contain polar groups in their chemical structure have desirable physical properties. In particular, polymer blends containing 80–95% of the vinyl chloride polymer and, correspondingly, 20–5% of the diene elastomer are easily processed and have considerably higher impact strength than the rigid vinyl chloride polymer included therein. Such polymer blends are useful in the fabrication of rigid shock resistant items such as pipe, tubing, sheets, and the like. Polymer blends containing larger quantities of the elastomer, e.g., 10–80% of the vinyl chloride polymer and, correspondingly, 90–20 parts of the diene elastomer, are tough flexible materials which resemble rubber and/or plasticized vinyl chloride polymers in properties, but have certain definitely superior properties as compared with either rubber or conventionally plasticized vinyl chloride polymers. The diene elastomers included in the above described polymer blends contain in their chemical structure polar groups such as chloride atoms, ester groups, nitrile groups and the like. Typical of the diene elastomers employed are polychloroprene, butadiene-acrylonitrile copolymers, butadiene-methyl isopropenyl ketone copolymers, butadiene-vinyl pyridine copolymers, butadiene-ethyl acrylate copolymers, etc.

Although blends of rigid vinyl chloride polymers and nonpolar hydrocarbon elastomers such as natural rubber, polybutadiene, styrene-butadiene rubbers, polyethylene and the like are known, these polymer blends do not have physical properties which correspond to those of the polymer blends described in the paragraph above. In particular, such blends of vinyl chloride polymers and the nonpolar hydrocarbon elastomers tend to be weak and cheesy. Obviously, it would be desirable to have available to the art means for preparing polymer blends of good properties from rigid vinyl chloride polymers and nonpolar hydrocarbon elastomers.

It is an object of this invention to provide novel polymer compositions having good properties and which include therein a rigid vinyl chloride polymer and a nonpolar hydrocarbon elastomer.

Other objects and advantages of this invention will be apparent from the following detailed description thereof.

The above and related objects are attained by preparing compositions consisting essentially of an intimate fusion blend of (1) a rigid vinyl chloride polymer, (2) a nonpolar hydrocarbon elastomer, and (3) a minor but effective quantity of a third component which renders a rigid vinyl chloride polymer and the nonpolar hydrocarbon elastomer more compatible and improves the physical properties, especially the impact strength, of the polymer blend. In the subsequent description of this invention, the third component of the polymer blend will be referred to as a "compatibilizing agent." The compatibilizing agents are graft copolymers prepared by polymerizing 10–200 and preferably 20–80 parts by weight of specified monomer mixtures in an aqueous dispersion containing 100 parts by weight of a rubbery diene polymer. The specified monomer mixtures employed in the preparation of the graft copolymers comprise monovinylidene aromatic hydrocarbons and nitriles selected from the group consisting of acrylonitrile, methacrylonitrile and mixtures of the same. The polymer blends of this invention are prepared by subjecting the rigid vinyl chloride polymer, the nonpolar hydrocarbon elastomer and the compatibilizing agent to an intensive mixing action at an elevated temperature.

The following examples are set forth to illustrate more clearly the principle and practice of this invention to those skilled in the art. Where parts or quantities are mentioned, they are parts or quantities by weight.

Unless otherwise noted, all of the polymer blends subsequently reported in the examples are prepared by the following standard procedure. The vinyl chloride polymer and a stabilizer therefore are worked on a 2-roll rubber mill until a rolling bank is formed. Thereafter, the compatibilizing agent, the nonpolar hydrocarbon elastomer and any additional components such as lubricants, fillers, etc., are added on the mill and the resulting mixture is worked for the period of time indicated in the examples. The roll temperatures are maintained at 340° F. throughout the mixing operation. The polymer blends are heated for 4 minutes at 185° C. and then compression molded for 1 minute at 185° C. under a pressure of 4,000 p.s.i. to prepare test specimens for measurement of physical properties.

EXAMPLE I

A blend of 95 parts of a vinyl chloride homopolymer, 5 parts of polyethylene and 2 parts of a tin stabilizer is milled for 25 minutes to prepare a control blend. This control blend has an Izod impact strength of only 1.5 ft. lbs./inch of notch.

The vinyl chloride resin included in the above blend is a commercially available vinyl chloride homopolymer which has a specific viscosity of about 0.48 as measured in an 0.4% solution in cyclohexanone at 25° C. The polyethylene included in the blend has a number average molecular weight of about 25,000–30,000 and a density of about 0.916–0.917.

EXAMPLE II

Part A

Four polymer blends are prepared having the composition and physical properties set forth in Table I.

TABLE I

| Blend Identification | N | O |
|---|---|---|
| Component: | | |
| Vinyl chloride resin | 95 | 95 |
| Polyethylene | 5 | |
| Polypropylene | | 5 |
| Styrene-acrylonitrile graft copolymer | 5 | 5 |
| Dibutyl tin dilauryl mercaptide | 2 | 2 |
| Stearic acid | 1 | 1 |
| Physical properties:[1] | | |
| Impact strength at 25° C. ft. lbs./inch of notch [2] | 22.0 | 22.0 |
| Tensile strength at yield, p.s.i. | 5,900 | 5,900 |
| Percent elongation at yield | 3.0 | 3.2 |
| Modulus at yield × 10$^5$, p.s.i. | 3.1 | 3.0 |

[1] All properties measured by current ASTM methods.
[2] Measured with a notch having a radius of curvature of 0.010".

The vinyl chloride resin, and polyethylene elastomer included in the blends are the same polymers described in Example I. The polypropylene elastomer in an atactic (amorphous) polymer having a molecular weight of about 40,000. The styrene-acrylonitrile graft copolymer is prepared by polymerizing 28 parts of styrene and 12 parts of acrylonitrile in a latex containing 100 parts of polybutadiene.

As earlier noted, the compositions of this invention comprises an intimate fusion blend of (a) a rigid vinyl chloride polymer, (b) a nonpolar hydrocarbon elastomer that is normally incompatible with said rigid vinyl chloride polymer, and (c) a compatibilizing agent that enhances the compatibility of the rigid vinyl chloride polymer and the nonpolar hydrocarbon elastomer.

The proportions of the rigid vinyl chloride polymer and the nonpolar hydrocarbon elastomer to be included in the polymer blends will depend primarily upon the properties desired in the blend. Where hard rigid materials suitable for use in the manufacture of pipe and similar items are desired, the polymer blends will contain about 70–98 parts of the rigid vinyl chloride polymer and, correspondingly, about 30–2 parts of the nonpolar hydrocarbon elastomer. Rigid polymer blends of optimum properties will contain 80–95 parts of the rigid vinyl chloride polymer and, correspondingly, 20–5 parts of the nonpolar hydrocarbon elastomer or more especially 85–95 parts of the rigid vinyl chloride polymer and, correspondingly, 15–5 parts of the nonpolar hydrocarbon elastomer. It will be understood, of course, that the particular proportions of the two polymers to be included in such rigid polymer blends will be somewhat dependent upon the nature and characteristics of the individual polymers employed therein. Where elastic, rubbery and/or leather-like materials are desired, the polymer blends may contain about 10–79 parts of the rigid vinyl chloride polymer and, correspondingly, about 90–21 parts of the nonpolar hydrocarbon elastomer.

The quantity of the compatibilizing agent included in the polymer blend will be sufficient to enhance the compatibility of the rigid vinyl chloride polymer and the nonpolar hydrocarbon elastomer. The minimum quantity required for this purpose will depend somewhat upon the particular compatibilizing agent employed, but can be established through routine experimentation. Specifically, to determine the minimum quantity of the compatibilizing agent required, the blend of the rigid vinyl chloride polymer, the nonpolar hydrocarbon elastomer and the compatibilizing agent should be worked for 15 minutes on a 2-roll rubber mill with the roll temperatures being maintained at 340° F. The resulting blend then should be compared with a similarly worked control blend that contains no compatibilizing agent. In the case of blends containing at least 70 parts of the rigid vinyl chloride resin and less than 30 parts of the nonpolar hydrocarbon elastomer, the blend containing the compatibilizing agent will have a higher Izod impact strength. The quantity of the compatibilizing agent employed should be such that the impact strength of the blend containing the compatibilizing agent is at least 0.5 ft. lb./inch of notch higher than the impact strength of the control blend. In the case of blends containing less than 70 parts of the rigid vinyl chloride polymer and more than 30 parts of the nonpolar hydrocarbon elastomer, the blend containing the compatibilizing agent will have a higher elongation at yield. In most cases, the compatibilizing agent will constitute 1–10 or preferably 2–8% by weight of the blend.

The vinyl chloride polymer included in the polymer blends may be any rigid vinyl chloride polymer such as vinyl chloride homopolymers and interpolymers of vinyl chloride with interpolymerizable monomers such as vinyl esters of organic acids containing 1–18 carbon atoms, e.g., vinyl acetate, vinyl stearate, etc.: vinylidene chloride; acrylonitrile; methacrylonitrile, alkyl acrylate esters in which the alkyl group contains 1–8 carbon atoms, e.g., methyl acrylate and butyl acrylate; the corresponding alkyl methacrylate esters; dialkyl esters of dibasic organic acids in which the alkyl groups contain 1–8 carbon atoms, e.g., dibutyl fumarate, diethyl maleate, etc. In general, where vinyl chloride interpolymers are employed, they should contain at least about 80 weight percent of vinyl chloride. To obtain optimum properties in the polymer blends, the vinyl chloride polymer included therein should have a relatively high molecular weight, e.g., the polymers should have a specific viscosity of at least about 0.4 as determined in an 0.4 weight percent solution in cyclohexanone at 25° C.

The nonpolar hydrocarbon elastomer included in the polymer blend may be essentially any thermoplastic hydrocarbon polymer or mixtures thereof that has an elongation at break of at least 5% and that is essentially free of polar substituents such as halogen atoms, ester groups, amide groups, amine groups, nitrile groups, hydroxyl groups, carboxyl groups and the like. One class of such nonpolar hydrocarbon elastomers consists of homopolymers of alpha-olefines such as ethylene, propylene, isobutylene and the like, interpolymers consisting solely of two or more such alpha-olefins and interpolymers of at least 85% by weight of such an alpha-olefine with up to 15% by weight of an interpolymerizable vinylidene monomer such as vinyl chloride, vinylidene chloride, vinyl acetate, alkyl acrylate esters such as methyl acrylate and butyl acrylate, the corresponding alkyl methacrylate esters, styrene, alpha-methylstyrene, ring-alkyl substituted styrenes, butadiene, isoprene and the like. Another class of suitable nonpolar hydrocarbon elastomers consists of homopolymers of acrylic conjugated 1,3-dienes such as butadiene, isoprene, 2,3-dimethylbutadiene, piperylene and the like and interpolymers of such conjugated dienes which contain at least 50% by weight of the conjugated diene. The comonomers included in such conjugated diene interpolymers preferably are hydrocarbon monomers such as styrene, alpha-methylstyrene, ring-alkyl substituted styrenes and the like. In some cases, if desired, the rubbery diene interpolymer may contain up to about 10% by weight of a vinylidene monomer containing a polar substituent such as a halogen atom, an ester group, an amide group, an amine group, a nitrile group, a hydroxyl group, a carboxyl group or the like. Typical examples of such polar monomers include acrylonitrile, methacrylonitrile, alkyl acrylate esters such as methyl acrylate and butyl acrylate, the corresponding alkyl methacrylate esters, vinyl acetate, acrylic acid, methacrylic acid, acrylamide, methacrylamide, vinylidene chloride, vinyl pyridine, ring-alkyl substituted pyridines and the like.

The compatibilizing agents used in the polymer blends are graft copolymers prepared by polymerizing 10–200 and preferably 20–80 parts by weight of specified monomer mixtures in an aqueous dispersion containing 100 parts by weight of a rubbery diene polymer. The monomer mixtures employed in the preparation of the graft copolymers comprise 10–90% by weight of either acrylonitrile or methacrylonitrile and, correspondingly, 90–10% by weight of a monovinylidene aromatic hydrocarbon. Typical of the monovinylidene aromatic hydrocarbon monomers that may be employed in the above monomer mixtures are styrene; ring-substituted alkylstyrenes, e.g., 2,4-dimethylstyrene, p-ethylstyrene, etc.; ring-substituted halostyrenes, e.g., o-, m-, and p-chlorostyrenes, 2,4-dichlorostyrene, etc.: ring-substituted alkyl-, ring-substituted halostyrenes, e.g., 2-methyl-4-chlorostyrene, etc.; or mixtures of such monovinylidene aromatic hydrocarbons, which mixtures may include a monovinylidene aromatic hydrocarbon compound which, by itself, will not readily interpolymerize with acrylonitrile or alkyl acrylate esters, e.g., alpha-methylstyrene.

The rubbery diene polymers on which the above described monomer mixtures are polymerized may be essentially any polymer of an acyclic conjugated 1,3-diene having a second order transition temperature below 0° C. and preferably below −20° C. The preferred diene polymers for this purpose are homopolymers of butadiene, isoprene, 2,3-dimethylbutadiene, piperylene, and the like or interpolymers of at least 50% by weight of such a diene with an interpolymerizable vinylidene monomer such as styrene, acrylonitrile, alkyl acrylates such as methyl acrylate, and butyl acrylate and the like. It is frequently desirable to include a small quantity e.g., 0.5–3.0% by weight of a polyunsaturated monomer such as divinyl benzene or diallyl maleate in the rubbery diene polymer.

Methods for preparing graft copolymers of the above types are well known. See for example U.S. 2,802,809 and the copending application of Massimo Baer, S.N. 706,543, filed Jan. 2, 1958, now abandoned.

In addition to the rigid vinyl chloride polymer, the nonpolar hydrocarbon elastomer and the compatibilizing agent, the polymer blends of this invention ordinarily will contain conventional stabilizers and anti-oxidants of the type employed with vinyl chloride polymers. If desired, colorants, lubricants, pigments, fillers, etc., also may be included in the polymer blends.

The rigid vinyl chloride polymer, the nonpolar hydrocarbon elastomer and the compatibilizing agent may be blended together by being worked on conventional plastics working equipment such as rubber mills, Banbury mixers, extruders, etc. The blends should be worked at a temperature above that at which the vinyl chloride polymer fuses to obtain an intimate well fused blend. Temperatures within the range of about 300–370° F. are normally employed. If desired, it is also possible to prepare an aqueous dispersion of the three components, e.g., by mixing latexes of the vinyl chloride polymer and the non-polar hydrocarbon elastomer and incorporating the compatibilizing agent in the mixed latexes, and then coagulating and/or drying the dispersion to recover a blend of the three components. After the mixed polymers are recovered by this procedure, it is still necessary to heat the mixture for a short time while comalaxating the composition on some type of plastics working equipment.

The preferred polymer blends of the invention are those in which the nonopolar hydrocarbon elastomer is a polymer of an alpha-olefine such as ethylene and particularly polyethylene. These polymer blends, in addition to having excellent physical properties, have outstanding resistance to oxidation and/or ultra-violet light. For this reason, such polymer blends are well adapted to be employed in the manufacture of articles which will be exposed to air and/or sunlight for extended periods of time.

The polymer blends of the invention can be molded, calendered or extruded into diverse shapes and forms such as rods, tubes, sheets, films, filaments, etc., by techniques well known in the polymer art. The rigid polymer blends, i.e., those containing at least 70% by weight of the rigid vinyl chloride polymer, have utility in many fields where vinyl chloride polymers of high impact strength are desired and especially in the manufacture of plastic pipe. The flexible polymer blends, i.e., those blends containing more than 30% by weight of the nonpolar hydrocarbon elastomer, have utility as an electrical cable insulation material, as a film in the manufacture of shower curtains and similar items, etc.

The above descriptions and particularly the examples are set forth by way of illustration only. Many other variations and modifications thereof will be obvious to those skilled in the art and can be made without departing from the spirit and scope of the invention herein described.

What is claimed is:

1. A composition of matter comprising an intimate fusion blend of 10–98 parts by weight of a rigid vinyl chloride polymer, said vinyl polymer comprising at least 80% by weight vinyl chloride and correspondingly, 90–2 parts by weight of a non-polar hydrocarbon elastomer selected from the group consisting of homopolymers of alpha-monoolefines, interpolymers of at least two alpha-monoolefines; interpolymers of at least 85% by weight of an alpha-monoolefine and up to 15% by weight of an interpolymerizable vinylidene monomer; homopolymers of acyclic conjugated 1,3-dienes; and interpolymers of at least 50% by weight of an acyclic conjugated 1,3-diene, up to 50% by weight of a hydrocarbon monomer selected from the group consisting of styrene, alpha-methyl styrene and ring-alkyl substituted styrenes, and up to 10% by weight of a vinylidene monomer having a polar substituent, said non-polar hydrocarbon elastomer normally being incompatible with said rigid vinyl chloride polymer; said composition also containing from about 1–10% by weight of graft-copolymer prepared by polymerizing 10–200 parts by weight of a monovinylidene aromatic hydrocarbon and a nitrile selected from the group consisting of acrylonitrile, methacrylonitrile and mixtures thereof in the presence of 100 parts by weight of a rubbery diene polymer having a second order transition temperature below about 0° C., said graft copolymer being sufficient to enhance the compatibility of the rigid vinyl chloride polymer and the non-polar hydrocarbon elastomer.

2. A composition of matter comprising an intimate fusion blend of 70–95 parts by weight of a rigid vinyl chloride polymer, said vinyl chloride polymer comprising at least 80% by weight vinyl chloride and correspondingly, 30–5 parts by weight of a non-polar hydrocarbon elastomer selected from the group consisting of homopolymers of alpha-monoolefines, interpolymers of at least two alpha-monoolefines; interpolymers of at least 85% by weight of an alpha-monoolefine and up to 15% by weight of an interpolymerizable vinylidene monomer; homopolymers of acyclic conjugated 1,3-dienes; and interpolymers of at least 50% by weight of an acyclic conjugated 1,3-diene, up to 50% by weight of a hydrocarbon monomer selected from the group consisting of styrene, alpha-methyl styrene and ring-alkyl substituted styrenes, and up to 10% by weight of a vinylidene monomer having a polar substituent said non-polar hydrocarbon elastomer normally being incompatible with said rigid vinyl chloride polymer; said composition also containing from about 1–10% by weight of graft copolymer prepared by polymerizing 10–200 parts by weight of a monovinylidene aromatic hydrocarbon and a nitrile selected from the group consisting of acrylonitrile, methacrylonitrile and mixtures thereof in the presence of 100 parts by weight of a rubbery diene polymer having a second order transition temperature below about 0° C., said graft copolymer being sufficient to enhance the compatibility of the rigid vinyl chloride polymer and the non-polar hydrocarbon elastomer.

3. A method for preparing an intimate fusion blend of a rigid vinyl chloride polymer and a non-polar hydrocarbon elastomer that is normally incompatible with said rigid vinyl chloride polymer which comprises comalaxating 10–98 parts by weight of a rigid vinyl chloride polymer, said vinyl chloride polymer comprising at least 80% by weight vinyl chloride and correspondingly 90–2 parts by weight of a non-polar hydrocarbon elastomer selected from the group consisting of homopolymers of alpha-monoolefines; interpolymers of at least two alpha-monoolefines; interpolymers of at least 85% by weight of an alpha-monoolefine and up to 15% by weight of an interpolymerizable vinylidene monomer; homopolymers of acyclic conjugated 1,3-dienes; and interpolymers of at least 50% by weight of an acyclic conjugated 1,3-diene, up to 50% by weight of a hydrocarbon monomer selected from the group consisting of styrene, alpha-methyl styrene, and ring-alkyl substituted styrenes, and up to 10% by weight of a vinylidene monomer having a polar substituent, with from about 1–10% by weight of graft copolymer prepared by polymerizing 10–200 parts of a monomer mixture of a monovinylidene aromatic hydrocarbon and a nitrile selected from the group consisting of acrylonitrile, methacrylonitrile and mixtures thereof in the presence of 100 parts by weight of a rubbery diene polymer having a second order transition temperature below about 0° C., said comalaxating temperature above the fusion point of the rigid vinyl chloride polymer.

4. A composition as in claim 1 in which the graft copolymer is styrene-acrylonitrile-polybutadiene.

5. A composition as in claim 1 in which the nonpolar hydrocarbon elastomer comprises mixtures of homopolymers and interpolymers of alpha-monoolefines.

6. A composition as in claim 1 in which the nonpolar hydrocarbon elastomer comprises mixtures of homopolymers and interpolymers of acyclic conjugated 1,3-dienes.

7. A composition as in claim 2 in which the graft copolymer is styrene-acrylonitrile-polybutadiene.

8. A composition in claim 2 in which the nonpolar elastomer comprises mixtures of homopolymers and interpolymers of alpha-monoolefines.

9. A composition as in claim 2 in which the nonpolar elastomer comprises mixtures of homopolymers and interpolymers of acyclic conjugated 1,3-dienes.

References Cited by the Examiner
UNITED STATES PATENTS

| | | | |
|---|---|---|---|
| 2,658,050 | 11/1953 | Signer et al. | 260—23.7 |
| 2,755,270 | 7/1956 | Hayes | 260—876 |
| 2,802,808 | 8/1957 | Hayes | 260—876 |
| 2,802,809 | 8/1957 | Hayes | 260—876 |
| 3,118,854 | 1/1964 | Hess et al. | 260—876 |

MURRAY TILLMAN, *Primary Examiner.*

GEORGE F. LESMES, *Assistant Examiner.*